(12) United States Patent
Hartwell (10) Patent No.: US 6,976,184 B2
(45) Date of Patent: *Dec. 13, 2005

(54) CLOCK FORWARD INITIALIZATION AND RESET SIGNALING TECHNIQUE

(75) Inventor: David Hartwell, Bolton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 138 days.

This patent is subject to a terminal disclaimer.

(21) Appl. No.: 10/649,523

(22) Filed: Aug. 27, 2003

(65) Prior Publication Data

US 2004/0049707 A1    Mar. 11, 2004

Related U.S. Application Data

(63) Continuation of application No. 09/652,980, filed on Aug. 31, 2000, now Pat. No. 6,629,257.

(51) Int. Cl.[7] ................................................ G06F 1/04
(52) U.S. Cl. ...................... 713/500; 713/375; 713/400; 713/501; 713/502; 713/503; 713/600; 375/371; 375/373; 375/376; 327/156; 327/160; 327/162
(58) Field of Search ........................ 713/401, 500–503, 713/600, 375, 400; 375/373, 376, 327, 371; 327/156, 160, 162; 714/51, 55

(56) References Cited

U.S. PATENT DOCUMENTS

| 4,618,953 | A | | 10/1986 | Daniels et al. | |
| 4,766,601 | A | | 8/1988 | Hammond | |
| 5,113,504 | A | | 5/1992 | Matsuda | |
| 5,274,452 | A | | 12/1993 | Kawamoto | |
| 5,471,488 | A | * | 11/1995 | Bender | 714/55 |
| 5,594,865 | A | | 1/1997 | Saitoh | |
| 5,652,844 | A | | 7/1997 | Harwood, III | |
| 5,850,514 | A | | 12/1998 | Gonda et al. | |
| 6,078,633 | A | | 6/2000 | Shiotsu et al. | |
| 6,225,840 | B1 | | 5/2001 | Ishimi | |
| 6,252,444 | B1 | | 6/2001 | Lee | |
| 6,456,135 | B1 | | 9/2002 | Albean | |
| 6,629,257 | B1 | * | 9/2003 | Hartwell | 713/502 |
| 6,782,068 | B1 | * | 8/2004 | Wilson et al. | 375/376 |

* cited by examiner

*Primary Examiner*—Lynne H. Browne
*Assistant Examiner*—Nitin C. Patel (57) ABSTRACT

A system and method for initializing and resetting a clocking subsystem having a phased locked loop (PLL) within an input/output interface of a data processing system. A first timer generates signals in response to receiving clock signals from a clock source. A second timer detects the presence or absence of signals from the first timer and in response to an absence outputs a circuit reset signal to a circuit. The circuit in turn issues a reset signal to the PLL and to other systems.

24 Claims, 6 Drawing Sheets

CLOCK FORWARD INITIALIZATION AND RESET SIGNALING TECHNIQUE

CONTINUATION CASE

The present application is a continuation of commonly assigned and U.S. patent application Ser. No. 09/652,980 filed on Aug. 31, 2000 now U.S. Pat. No. 6,629,257 and has the same title and inventors as the present application. This prior application is incorporated herein by reference, and priority is claimed therefrom under 35 U.S.C. §120.

INCORPORATION BY REFERENCE OF RELATED APPLICATIONS

The present application is related to the following co-pending, commonly owned U.S. Patent Applications, all of which were filed on even date with the parent of the present continuation application for United States Patent and are each hereby incorporated by reference in their entirety:

U.S. patent application Ser. No. 09/652,644 filed on Aug. 31, 2000, entitled ADAPTIVE DATA PREFETCH PREDICTION ALGORITHM;

U.S. patent application Ser. No. 09/653,133 filed on Aug. 31, 2000, now issued as U.S. Pat. No. 6,456,510 on Sep. 24, 2002 entitled UNIQUE METHOD OF REDUCING LOSSES IN CIRCUITS USING V² PWM CONTROL;

U.S. patent application Ser. No. 09/652,641 filed on Aug. 31, 2000, entitled IO SPEED AND LENGTH PROGRAMMABLE WITH BUS POPULATION;

U.S. patent application Ser. No. 09/652,458 filed on Aug. 31, 2000, entitled PARTITION FORMATION USING MICROPROCESSORS IN A MULTIPROCESSOR COMPUTER SYSTEM;

U.S. patent application Ser. No. 09/944,517 filed on Aug. 31, 2001, entitled SYSTEM AND METHOD FOR USING FUNCTION NUMBERS TO INCREASE THE COUNT OF OUTSTANDING SPLIT TRANSACTIONS;

U.S. patent application Ser. No. 09/652,984 filed on Aug. 31, 2000, entitled SYSTEM AND METHOD FOR PROVIDING FORWARD PROGRESS AND AVOIDING STARVATION AND LIVELOCK IN A MULTIPROCESSOR COMPUTER SYSTEM;

U.S. patent application Ser. No. 09/,653,180 filed on Aug. 31, 2000, entitled ONLINE ADD/REMOVAL OF SERVER MANAGEMENT INFRASTRUCTURE;

U.S. patent application Ser. No. 09/652,494 filed on Aug. 31, 2000, entitled AUTOMATED BACKPLANE CABLE CONNECTION IDENTIFICATION SYSTEM AND METHOD;

U.S. patent application Ser. No. 09/652,459 filed on Aug. 31, 2000, entitled AUTOMATED BACKPLANE CABLE CONNECTION IDENTIFICATION SYSTEM AND METHOD;

U.S. patent application Ser. No. 09/944,515 filed on Aug. 31, 2001, entitled PASSIVE RELEASE AVOIDANCE TECHNIQUE;

U.S. patent application Ser. No. 09/652,985 filed on Aug. 31, 2000, entitled COHERENT TRANSLATION LOOK-ASIDE BUFFER;

U.S. patent application Ser. No. 09/652,645 filed on Aug. 31, 2000, entitled DETERMINISTIC HARDWARE BEHAVIOR BETWEEN MULTIPLE ASYNCHRONOUS CLOCK DOMAINS THROUGH THE NOVEL USE OF A PLL; and U.S. patent application Ser. No. 09/655,171 filed on Aug. 31, 2000, entitled VIRTUAL TIME OF YEAR CLOCK.

FIELD OF THE INVENTION

The present invention relates to data processing systems and, in particular, to a technique for automatically resetting and reinitializing a clocking subsystem of a data processing system.

BACKGROUND OF THE INVENTION

Conventional data processing systems may utilize a phase locked loop (PLL) circuit in a clocking subsystem to recover and phase-align a clock signal that may be transmitted from a forwarded clocking domain to a synchronous clocking domain of a data processing system. The PLL is a closed loop frequency control circuit that performs its function by detecting the phase difference between an input clock signal and an output signal generated by a voltage-controlled oscillator (VCO). A problem with the use of a PLL in such an application is that when the input clock signal is applied to the circuit, it may not automatically become operational. That is, there are typically a number of input parameters that must be configured prior to proper operation of the PLL. These parameters may be adjusted with the use of external jumpers that may be changed as process modifications occur with respect to, e.g., an application specific integrated circuit (ASIC) within which the PLL may be embedded. Alternatively, the input parameters may be adjusted by internal logic that does not rely upon proper PLL operation to set and adjust such parameters.

In an application in which a PLL-based clocking subsystem is used in an input/output (I/O) subsystem of a data processing system, the output clock signal from the PLL is used to activate (i.e., clock) logic contained in an I/O interface circuit of the I/O subsystem. The logic contained in the I/O interface between a processor and I/O subsystem is generally non-operational until the clock signals delivered from the PLL are synchronized to enable transmission of commands between the processor and I/O subsystem. A server management subsystem within the data processing system may be unable to initialize any circuits within the I/O interface nor access any registers, e.g., control status registers (CSRS) within that interface without adding unnecessary complexity to the I/O interface and management subsystem.

Another way of initializing the circuitry within the I/O interface involves the use of special signals between the processor and I/O interface. This approach requires the use of different cables to accommodate those signals and, thus, obviates the ability to reuse similar cables between processors, and between processors and I/O subsystems, thereby creating a complicated cabling arrangement. Moreover, data processing systems, such as high performance server computers, typically utilize synchronous clock forwarded interface circuits to provide high data bandwidth on relatively narrow interconnects or links associated with the interface circuits. Clock forwarding is a technique in which data signals are accompanied by clock signals. It is thus desirable to keep the interfaces between the processors and I/O subsystems (in particular the I/O interfaces) similar to thereby enable the use of similar parts, such as cables, in a low cost manner.

The present invention is generally directed to a circuit configured to initialize a PLL within a clocking subsystem upon startup and re-initialize the PLL in the absence (or loss) of forwarded clock signals propagating between a processor and I/O interface. These clock signals may stop propagating as a result of failures in the cable coupling a processor to an I/O interface or faults in the logic circuitry of the I/O interface. All input signals received at the PLL must be preconfigured and stable prior to proper functioning of the PLL, particularly one that is embedded in an ASIC. In addition, the forwarded clock signals received at the PLL must be stable prior to initial startup of the PLL circuit. Therefore, a reset input to the PLL cannot be released until the input clock signal is stable and the other input signals are stable. As a result, the present invention is directed to a technique that enables detection of the forwarded clock signals received at a PLL and that activates (brings up) the PLL in a predetermined sequence that comports with the specifications and requirements of the vendor's PLL.

SUMMARY OF THE INVENTION

The present invention is directed to a circuit for automatically resetting and initializing a clocking subsystem within an input/output (I/O) interface of a data processing system. The novel initialization/reset logic circuit is contained within the I/O interface and clock signals (i.e., clock forwarded clock signals) are provided from a clock source of the data processing system to the initialization/reset logic circuit. In the illustrative embodiment described herein, the I/O interface is preferably implemented as an application specific integrated circuit (ASIC) and the clock source is preferably a processor of the system.

In accordance with the invention, the PLL of the initialization/reset logic circuit includes a plurality of inputs, such as a reference clock input for receiving forwarded clock signals from the processor and a reset input for receiving a reset signal that resets the PLL, along with an output that delivers an ASIC clock that is phased-aligned to the forwarded clock. The initialization/reset logic circuit also comprises a counter having a plurality of inputs, including a clock input that receives the forwarded clock signals, a first reset input that receives a reset signal generated by the initialization/reset logic and a second reset input that receives an external reset signal generated by a voltage monitor device in response to module power transitions, e.g., the absence of DC OK. Outputs of the counter comprise a first reset output for delivering global ("ASIC") reset signals to the I/O interface, a second reset output for delivering PLL reset signals and a third reset output for delivering an error control status register (CSR) reset signal to a set of error registers. A timer circuit receives the forwarded clock signals at its input and generates 20 microsecond ($\mu$sec), pulsed timer signals that are delivered to a watchdog timer circuit. The watchdog timer is configured to detect the presence (or absence) of the pulsed timer signals at its input. A reset output of the watchdog timer delivers reset signals to the reset input of the counter.

Before the forwarded clock signals are received at the timer circuit and, thus, in the absence of the 20 $\mu$sec signal, the watchdog timer "times out" and periodically asserts a reset signal to the counter which, in turn, provides reset signals to the PLL and various logic circuitry of the ASIC. Notably, however, assertion of the reset signal does not reset the 20 $\mu$sec timer circuit or the contents of the error (CSR) registers. Once the clock signals are received at the timer circuit and the 20 $\mu$sec pulsed timer signals are generated, the watchdog timer halts issuance of the periodic reset signals. These received clock signals also initiate logical functions that initially place the PLL in a reset state waiting for the PLL reference clock input and its other input signals to stabilize.

After a predetermined period of time, the PLL reset input signal is released and a second timer begins. After a subsequent predetermined period of time that allows the PLL to "lock" to the incoming clock signals, phased-aligned clock signals are distributed throughout the I/O interface. Thereafter, the second timer expires and releases the global ASIC reset signal, thereby initializing the I/O interface to a predefined state. At this point, communication between the processor and the ASIC is possible. In certain cases, clock signals received from the processor may be stopped intentionally or due to errors or failures; as a result, communication between the processor and the ASIC is no longer possible. Consequently, the PLL no longer operates correctly, if at all, and requires execution of the initialization sequence described above. The watchdog timer senses the absence of the 20 $\mu$sec signal and reinitializes the ASIC and PLL, while CSR error state is maintained, without any other external intervention.

Advantageously, the present invention provides a means for initializing a PLL-based clocking system without the use of special signals and control mechanisms. Prior attempts to initialize such a subsystem involved a system global reset signal means and/or a local reset signaling means operating independently of the unit to be reset. The present invention provides a simpler solution that requires no external reset mechanism and that self-initializes the PLL, initializes the I/O interface and retains critical error state despite the loss and subsequent restart of the forwarded clock signals. In addition, the initialization/reset logic circuit reduces part counts and enables an inexpensive implementation.

BRIEF DESCRIPTION OF THE DRAWINGS

The above and further advantages of the invention may be better understood by referring to the following description in conjunction with the accompanying drawings, in which like reference numbers indicated identical or functionally similar elements.

DETAILED DESCRIPTION OF AN ILLUSTRATIVE EMBODIMENT

Figure 1:
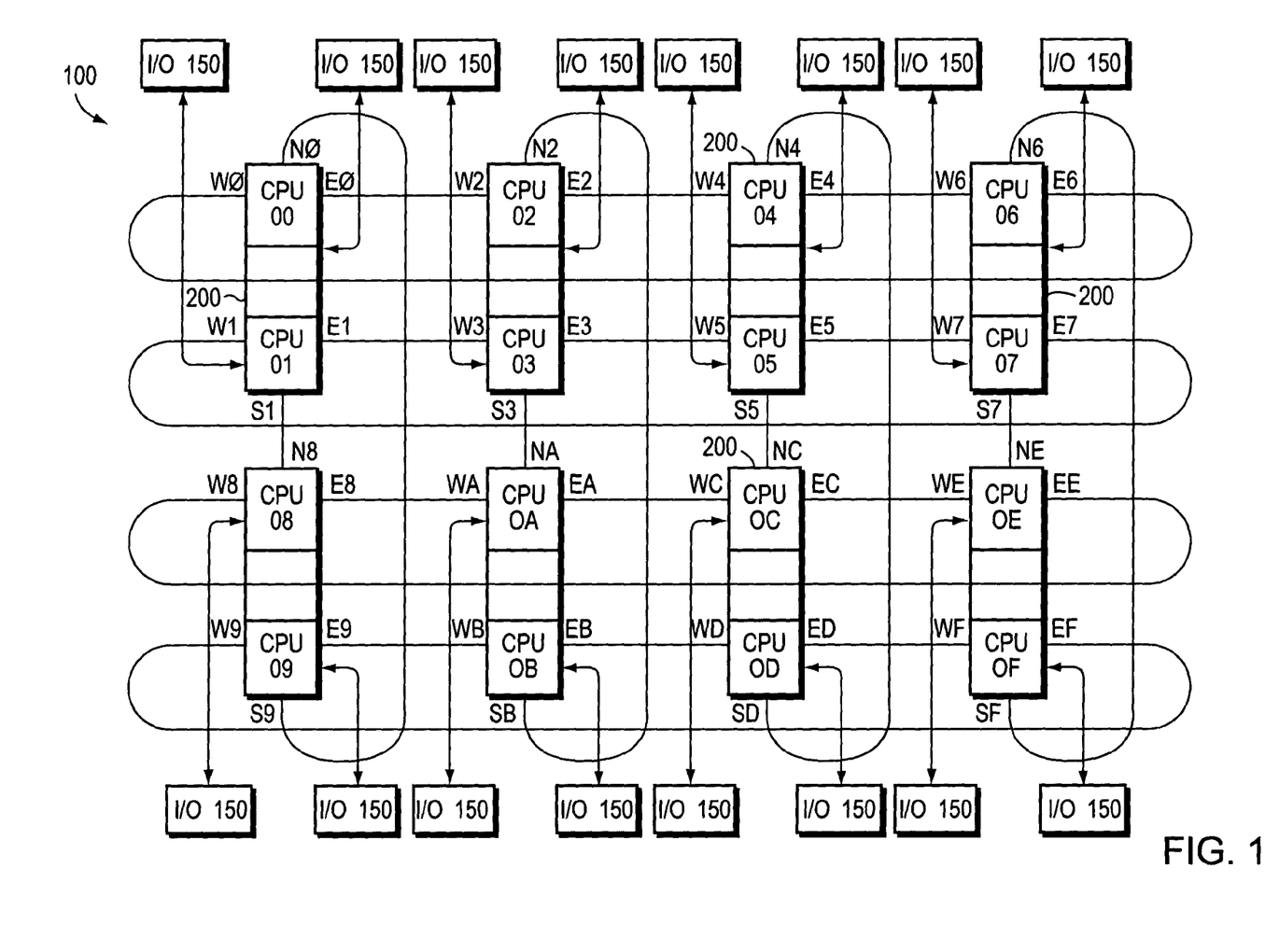
FIG. 1 is a schematic block diagram of a symmetrical multiprocessor (SMP) system comprising a plurality of dual processor (2P) modules interconnected to form a two dimensional (2D)-torus mesh configuration.

FIG. 1 is a schematic block diagram of a data processing system 100 that may be advantageously used with the present invention. In the illustrative embodiment, the data processing system is preferably a symmetrical multiprocessor (SMP) system 100 comprising a plurality of processor modules 200 interconnected to form a two dimensional (2D)-torus mesh configuration. Each processor module 200 comprises two central processing units (CPUs) with connections for two input/output (I/O) ports along with 6 inter-processor (IP) network ports. The network ports are preferably referred to as North (N), South (S), East (E) and West (W) compass points, wherein the North-South (NS) and East-West (EW) compass point connections create a (manhattan) grid. Additionally, the outside ends of the mesh wrap-around and connect to each other. I/O traffic enters the 2D torus via I/O channel connections between the CPUs and I/O subsystem 150. Each compass point is coupled to an IP channel that comprises 2 unidirectional, clock forwarded links.

Figure 2:
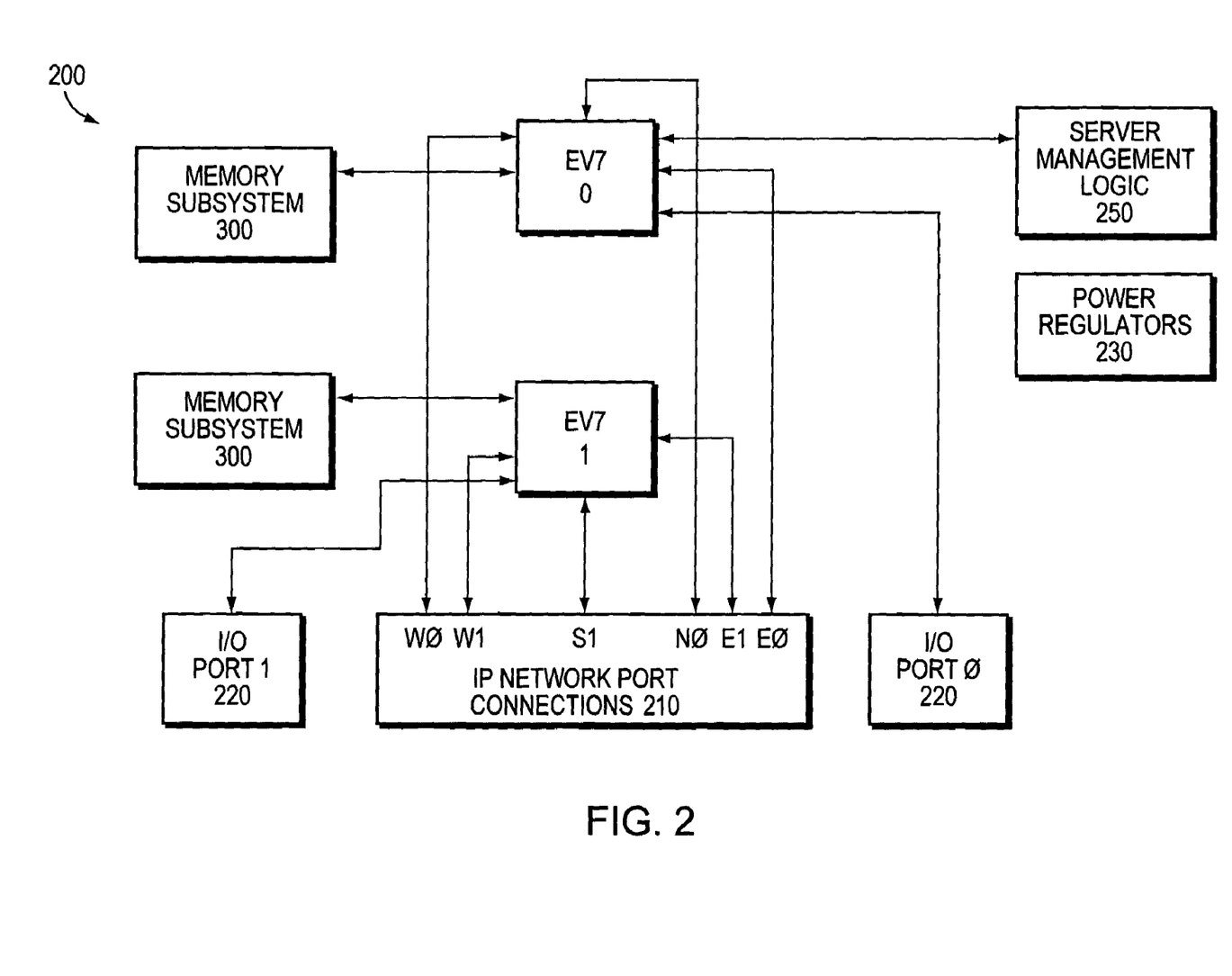
FIG. 2 is a schematic block diagram of a 2P module of FIG. 1.

FIG. 2 is a schematic block diagram of the processor (2P) module 200. As noted, the 2P module 200 comprises 2 CPUs with connections 210 for the IP ("compass") network ports and an I/O port 220 associated with each CPU. The 2P module 200 also includes power regulators 230, system management logic 250 and memory subsystem 300 coupled to 2 memory ports of each CPU. The system management logic 250 cooperates with a server management system to control functions of the SMP system. Each of the N, S, E and W compass points, along with the I/O and memory ports use clock-forwarding, i.e., forwarding clock signals with the data signals, to increase data transfer rates and reduce skew between the clock and data.

Each CPU is preferably an EV7 processor comprising an EV6 core, 2 memory controllers, an I/O port interface and 4 network ports. In the illustrative embodiment, the EV7 supports up to 256 processors and 256 IO7s. The EV6 core preferably incorporates a traditional reduced instruction set computer (RISC) load/store architecture. In the illustrative embodiment described herein, the EV6 cores are generally the Alpha® 21264 processor chips manufactured by Compaq Computer Corporation® with the addition of an internal cache and CBOX, the latter providing integrated cache controller functions to the EV7 processor. However, it will be apparent to those skilled in the art that other types of processor chips may be advantageously used. The EV7 processor also includes a RBOX that provides integrated routing/networking control functions with respect to the compass points. The EV7 further includes a ZBOX that provides integrated memory controller functions for controlling the memory subsystem.

Figure 3:
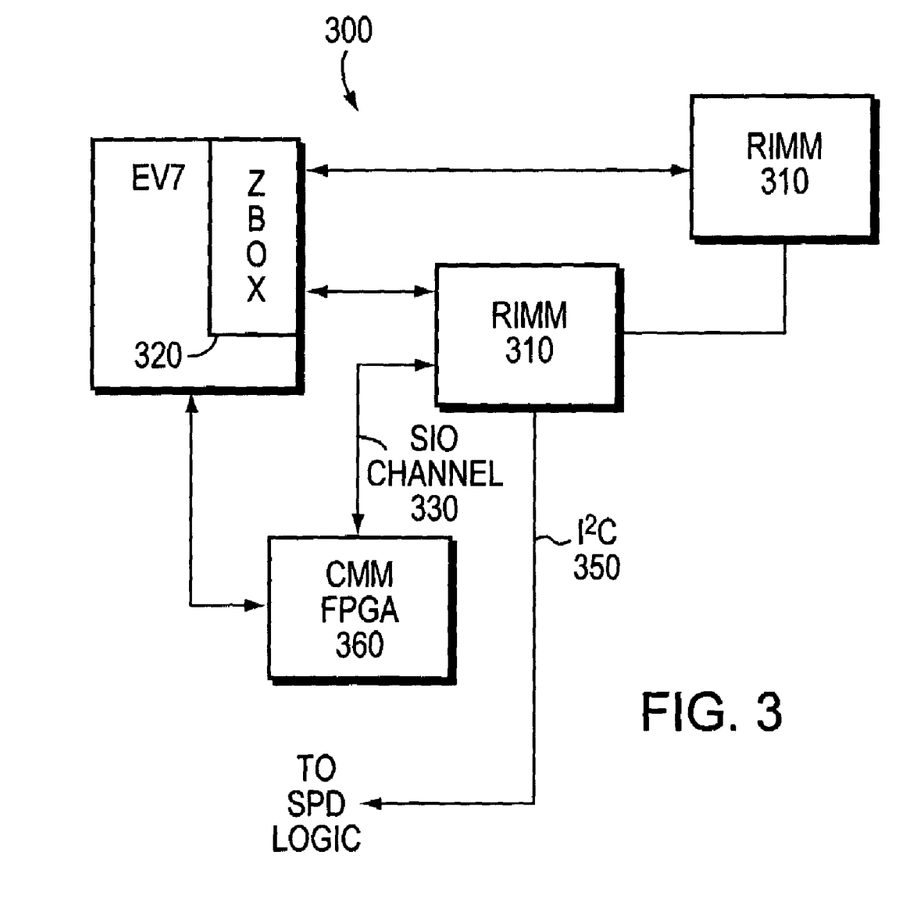
FIG. 3 is a schematic diagram of a memory subsystem of the SMP system.

The memory subsystem 300 is preferably implemented using RAMBUS technology and, accordingly, the memory space is generally divided between 2 RAMBUS controllers. However, an EV7 processor can operate with 0, 1 or 2 RAMBUS controllers. FIG. 3 is a schematic diagram of the SMP memory subsystem 300 illustrating connections between the EV7 and RAMBUS memory modules (RIMMs 310). Software configures the memory controller logic (ZBOX 320) within the EV7 and the logic on each RIMM 310 before testing and initializing memory. Specifically, the memory subsystem components include 2 RAMBUS memory controllers (not shown) within the ZBOX 320, a RIMM 310 containing RDRAM memory devices, a serial I/O (SIO 330) channel to RDRAMs of the RIMMs 310, serial presence detect (SPD) logic (EEPROM data) via an I²C bus 350, and a CPU management module (CMM) field programmable gate array (FPGA 360) that interfaces between a CMM (not shown) and the EV7 processor.

Figure 4:
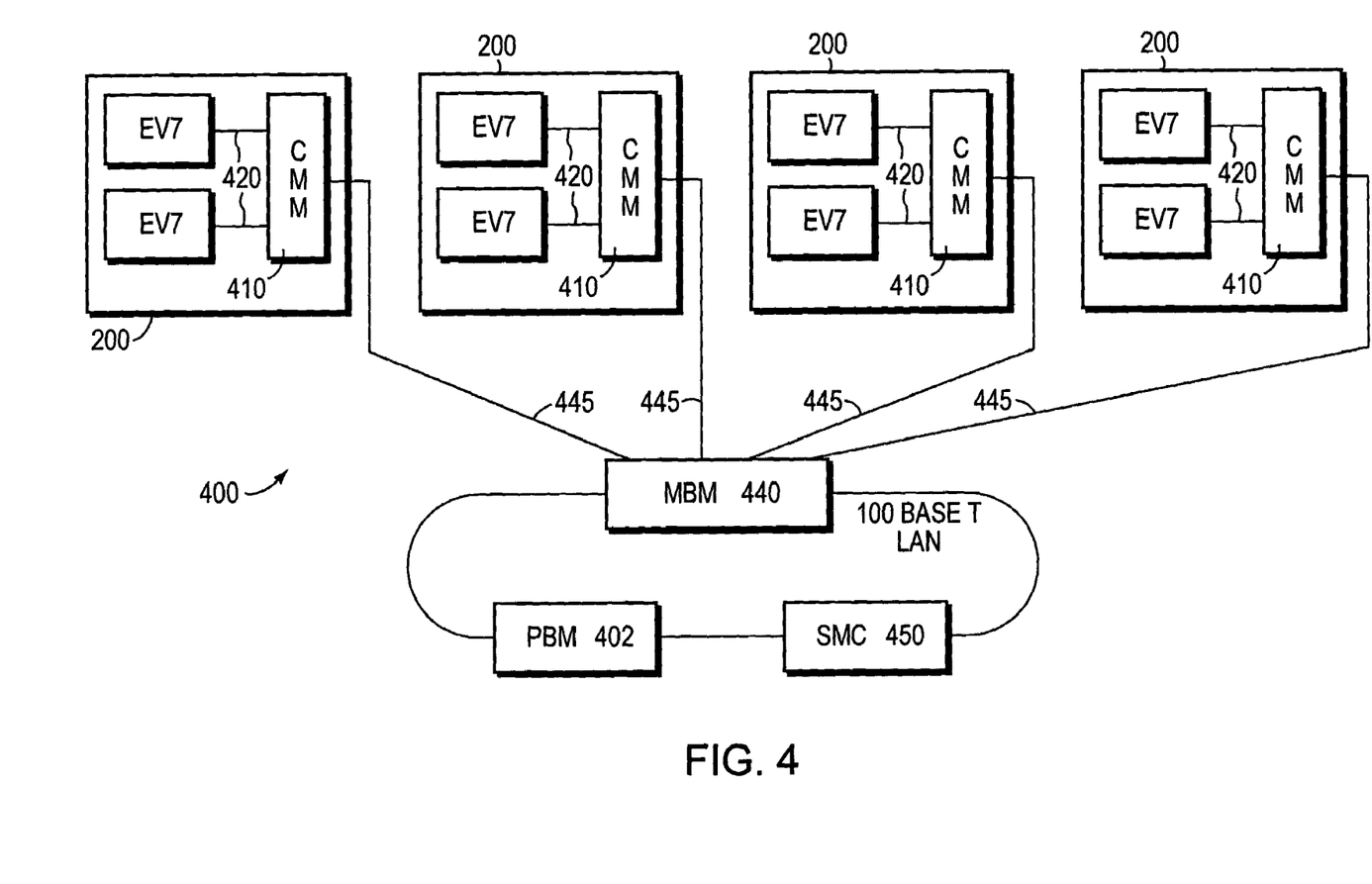
FIG. 4 is a schematic block diagram of a server management platform for the SMP system.

FIG. 4 is a schematic block diagram of the server management platform 400 for the SMP system. The server management comprises a 3-tier management scheme that is used to bring up ("boot") the SMP system. At the lowest level, each 2P module 200 has a plug-in, CPU management module (CMM 410) that provides power and initialization control for the local 2P module. The CMM also interfaces directly to both EV7 processors via serial links 420 and provides debug, initialization, error collection and communication support to a higher, intermediate level of the service management hierarchy.

The intermediate level of service management is provided by a system backplane manager (MBM) 440 contained within a CPU drawer of the SMP system. Each CMM 410 on each 2P module 200 communicates with an MBM 440 through a point-to-point serial connection 445 that is preferably implemented in etch so as to obviate the need for a cable connection. The MBM controls the overall operation of the intermediate level by functioning as the master of the CMMs. In the illustrative embodiment, each MBM controls 4 CMM devices within the CPU drawer.

The MBM 440 spawns a server manager network port that is connected to a service management LAN hub. The MBMs 440 preferably communicate with I/O backplane managers (PBM 402), the latter of which are contained in I/O drawers of the system. Communication among the server managers of the platform 400 is preferably effected via a TCP/IP protocol over a server management LAN. In the illustrative embodiment, the server management platform is implemented as a 100 base T (Ethernet) LAN, although similar types of local area network implementations, such as Token Ring or FDDI, may be advantageously used with the system.

A personal computer (PC) or similar network device connected to one of the ports of the service management LAN hub serves as a server management console (SMC 450). The SMC 450 provides the highest level of server management and, to the end, executes a platform management utility that provides a unified view of the entire SMP system for purposes of controlling the system. From a physical implementation, the MBMs, PBMs and SMC are coupled to the service management hub; however, logically they are interconnected by the LAN.

Figure 5:
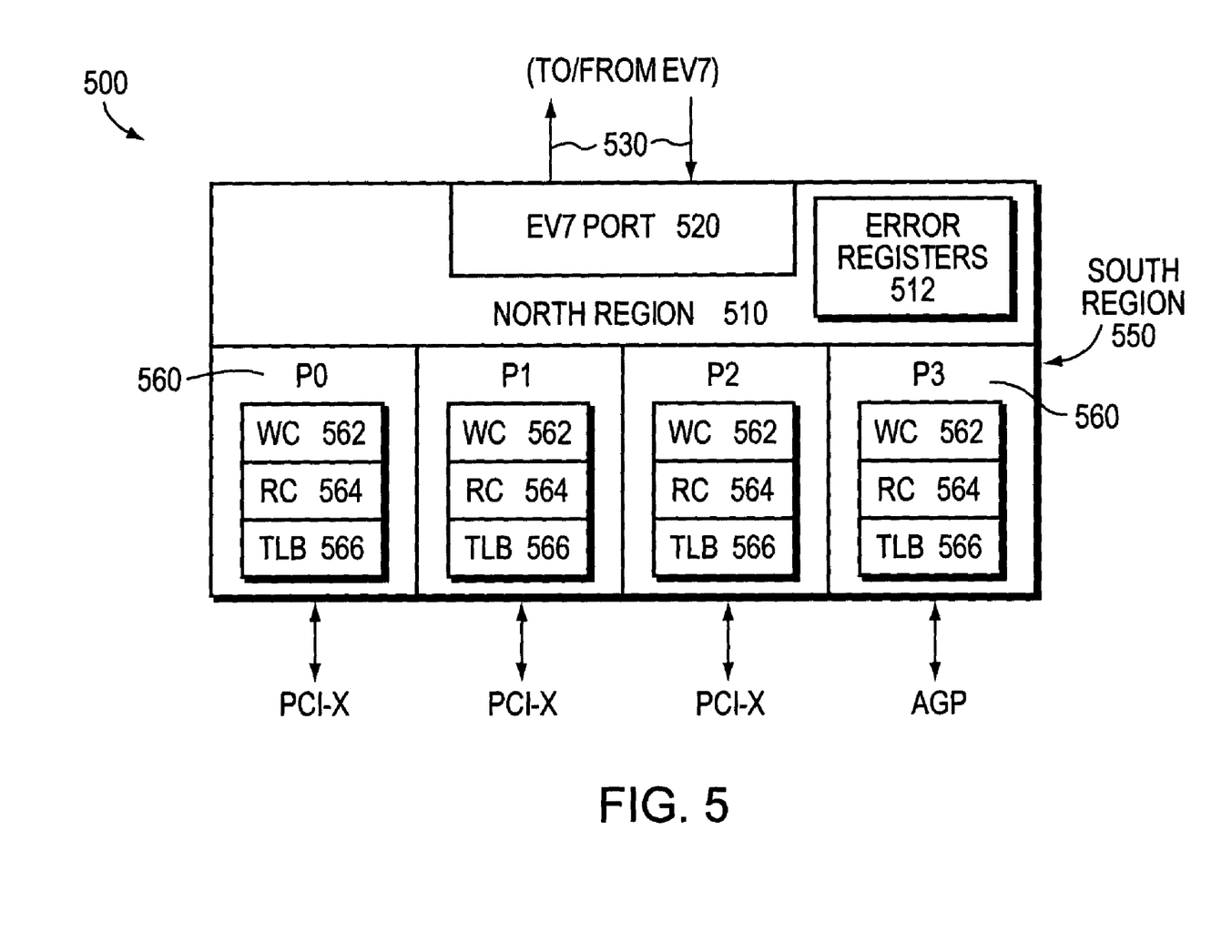
FIG. 5 is a schematic block diagram of an IO7 of an I/O subsystem of the SMP system.

FIG. 5 is a schematic block diagram of an IO7 device 500 that provides a fundamental building block for the SMP I/O subsystem 150. The IO7 is preferably implemented as an application specific integrated circuit (ASIC) using IBM SA27E ASIC technology. Each EV7 processor supports one I/O ASIC connection; however, there is no requirement that each processor have an I/O connection. In the illustrative embodiment, the I/O subsystem 150 includes an I/O drawer (not shown) with hot-swap Peripheral Computer Interconnect (PCI)-X and Accelerated Graphics Port (AGP) support. The I/O drawer includes an IO7 plug-in card that spawns 4 I/O buses.

The IO7 500 comprises a North circuit region 510 (i.e., the I/O interface) that interfaces to the EV7 processor and a South circuit region 550 that includes a plurality of I/O ports 560 (P0–P3) that interface to industry standard I/O buses. An EV7 port 520 of the North region 510 couples to the EV7 processor via 2 unidirectional, clock forwarded links 530. In the illustrative embodiment, 3 of the 4 I/O ports 560 interface to buses that operate according to, e.g., the conventional PCI-X protocol, while the 4th port interfaces to an AGP bus. The IO7 generally includes the same functionality as provided by the IOA, IOD and PCA ASICs of the AS80, AS160 and AS320 family of servers manufactured by Compaq Computer Corporation®.

Figure 6:
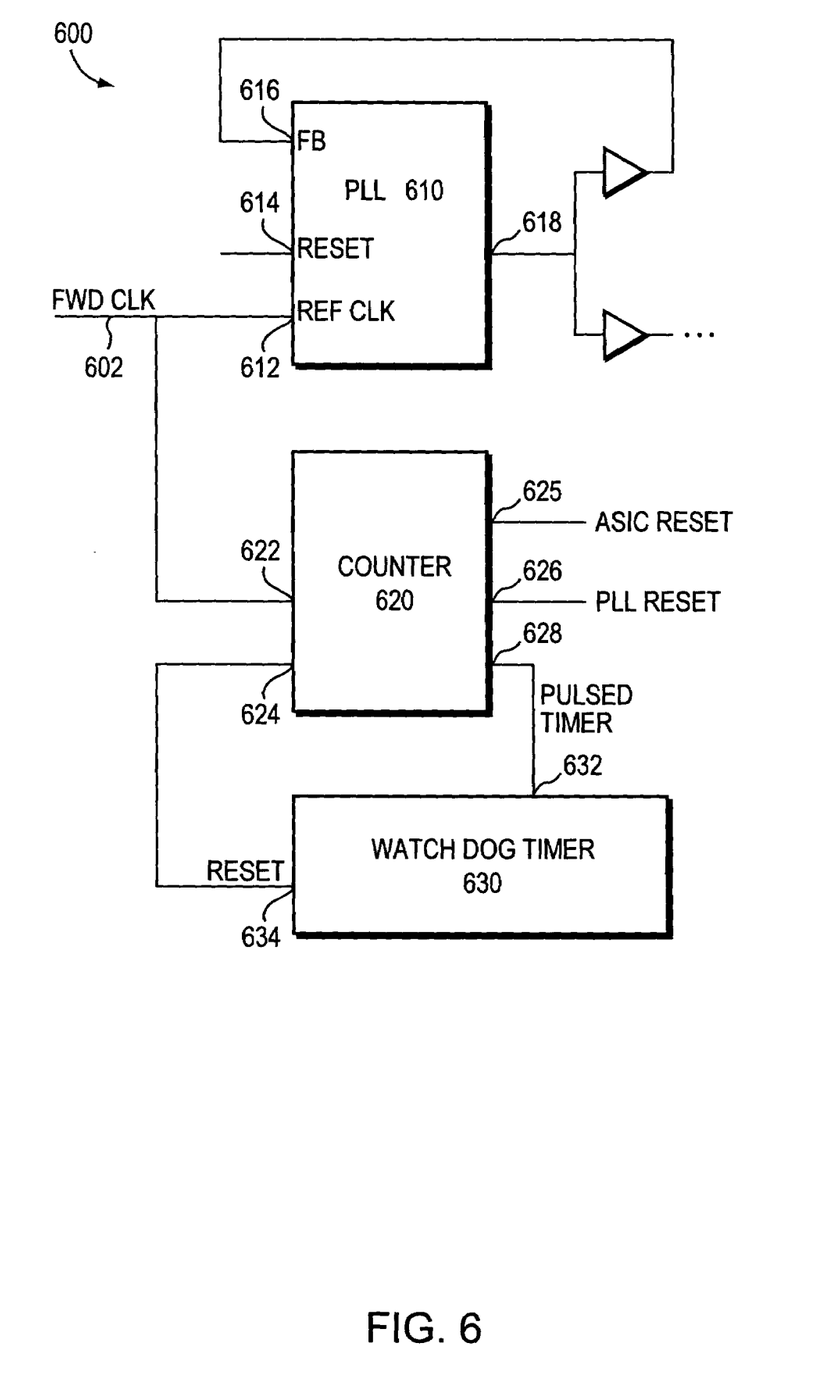
FIG. 6 is a schematic block diagram of an initialization/ reset logic circuit of the IO7 in accordance with present invention.

FIG. 6 is a schematic block diagram of an initialization/reset logic circuit 600 of the present invention. The initialization/reset logic circuit 600 is preferably contained within an I/O interface circuit and, in the illustrative embodiment described herein, within the North circuit region 510 of the IO7 500. In accordance with the invention, the logic circuit 600 comprises a conventional phase locked loop (PLL) circuit 610 having a plurality of inputs and an output. The inputs include a reference clock input 612 for receiving forwarded clock signals over line 602 from the EV7 processor, a reset input 614 for receiving a reset signal that resets the PLL and a feedback (FB) input 616 that receives feedback signals from the output 618 of the PLL. The output signals (and feedback signals) delivered at the output 618 of the PLL are preferably phased-aligned to the reference input clock forwarded clock signals.

The logic circuit 600 also includes a conventional counter 620 that receives the forwarded clock signals at a clock input 622, a reset signal generated by the initialization/reset logic at a first reset input 624 and an external reset signal at a second reset input 621. The external reset signal is preferably generated by a conventional, "off-the-shelf" 3-terminal, voltage monitor device in response to module power transitions, e.g., the absence of DC OK. The counter further comprises a plurality of outputs, including a first reset output 625 for delivering global ("ASIC") reset signals, a second reset output 626 for delivering PLL reset signals and a third reset output 628 for delivering an error control status register (CSR) reset signal to a set of error (CSR) registers 512. The counter 620 and PLL 610 are preferably embedded within the IO7 500 and, thus, are implemented using the IBM SA27E technology. In addition, the ASIC reset signals are provided to logic within the North circuit region 510 of the IO7, whereas the PLL reset signals are provided to the reset input 614 of the PLL 610. A conventional timer circuit 640 receives the forwarded clock signals at its input 642 and generates 20 microsecond is ($\mu$sec), pulsed timer signals that are delivered via its output 644 to an external, conventional watchdog timer circuit 630. The watchdog timer 630 is configured to detect the presence (or absence) of the pulsed timer signals at its input 632. A reset output 634 of the watchdog timer delivers reset signals to the reset input 624 of the counter 620.

Operation of the novel initialization/reset logic circuit 600 is as follows. The CMM 410 on the CPU module 200 initiates the power-up sequence of the EV7 processor, including the issuance of the clock forwarded signals to the IO7 500. The PBM 402 enables the application of power to the I/O drawer and to the I/O subsystem 150, although there are no clock signals present in the I/O drawer until the forwarded clock signals are received from the EV7 processor. Upon power-up, no forwarded clock signals are provided over line 602 to the PLL 610, counter 620 or timer 640. The watchdog timer 630 monitors its input 632 for the presence of the pulsed timer signals. Yet, no timer signals are forwarded to the watchdog timer due to the lack of forwarded clock signals to the IO7 and timer 640; accordingly, the watchdog timer 630 asserts a reset signal at its output 634. The reset signal is received at the input 624 of the counter and functions to reset the counter's logic by placing that logic in a reset state for a predetermined period of time. The external reset signal is also asserted for approximately 100–300 $\mu$secs following IO7 power stability to initialize (reset) the state of the error CSRs; after this period of time, external reset is released. Subsequently, the SMP system 100 "comes up" during the power-up procedure and the system software "brings up" the I/O subsystem 150 by, among other things, issuing forwarded clock signals to the I/O interface 510.

As part of the power-up sequence, the forwarded clock signals are received at the I/O interface 510. However, only clock signals are received at the interface 510, i.e., there are no accompanying data signals, at this time. Specifically, the forwarded clock signals are received at the clock inputs 612, 622 and 642 of the PLL, counter 620 and timer 640, respectively. Reception of the forwarded clock signals at the timer 640 results in the generation of the 20 $\mu$sec pulsed signals. These pulsed timer signals are forwarded to the watchdog timer 630, which detects the presence of these signals at its input 632. Meanwhile, the PLL and IO7 logic are held in reset as a result of the assertion of PLL and ASIC reset signals at outputs 626, 625 of the counter 620. Approximately 200 milliseconds (msecs) after detecting the presence of clock signals at its input, the watchdog timer 630 de-asserts the reset signal at its output 634. After a predetermined period of time (e.g., 1.3 $\mu$secs) and in response to de-assertion of the reset signal, the counter 620 de-asserts the PLL reset signal at its output 626.

At this point, the forwarded clock signals received at the PLL have been stable for a sufficient period of time such that it may be assumed (to a high degree) that the input signals to the PLL will not change. Therefore, the time period needed for the PLL to "lock-up" and synchronize with the incoming forwarded clock signals may be started. In the illustrative embodiment, this time period is approximately 200 $\mu$secs. However, the counter does not release the ASIC reset signal at its output 625 which would enable the clock signals delivered by the PLL to be utilized by the IO7 ASIC logic until phase alignment has been achieved and the PLL is "locked". Thus, approximately 655 $\mu$secs later (when phase alignment and locking is assured) the ASIC reset signal is released, the IO7 ASIC logic is operational and data may be transferred between the EV7 processor and IO7 500. It should be noted that the error CSR reset signal is not asserted at this time and, in fact, is only asserted in response to assertion of the external reset signal at input 621 of the counter 620.

Assume now that the forwarded clock signals from the processor to the I/O interface "disappear" because, e.g., the cable between the processor and I/O subsystem breaks or a fatal error condition arises between the processor and I/O subsystem 150. As described further herein, by inhibiting issuance of (i.e., "turning off") the clock forwarded signals and subsequently reissuing them, the entire I/O interface 510 may be reset and reinitialized with error state retained during this transition. In addition, logic within the I/O interface may "hang" due to an error in its logic which thereby inhibits the exchange of transactions between the processor and I/O subsystem. Therefore, the invention provides a novel technique for the processor to reset and reinitialize the I/O subsystem in the event of such an occurrence. In accordance with the present invention, this novel technique comprises the initialization/reset logic's response to the absence of clock signals issued from the processor to the I/O subsystem.

Specifically, when the forwarded clock signals "disappear", the PLL continues to operate with the output clock signal either ramping up to its voltage controlled oscillator (VCO) frequency, e.g., 1 Gigahertz (GHz), or ramping down to zero (0). Yet the clock inputs to counter 620 and timer 640 are provided from the forwarded clock signals, not the PLL clock signals. The 20 $\mu$sec pulsed signals from the timer 640 immediately cease and, approximately 1.6 secs thereafter in response to detecting the absence of pulsed signals at its input 632, the watchdog timer 630 asserts the reset signal at its output 634. The asserted reset signal resets substantially all of the I/O interface 510 of the I/O subsystem waiting for forwarded clock signals to reappear and, therefore, reinitializes the I/O subsystem. More specifically, the asserted reset signal does not reset the 20 $\mu$sec timer 640 or the error (CSR) registers 512.

When the processor inhibits issuance of forwarded clock signals, thereby enabling the re-initialization and reset sequence described above, the set of error registers 512 capture error information that may be related to the cause of the "hang" (error). In accordance with an aspect of the present invention, the reset sequence resets most of the logic within the I/O interface, with the exception of these error registers so as not to lose that error information. The error registers 512 are preferably located within the North circuit region 510 of the IO7 500 and, as noted, those registers are cleared independent of the reset sequence, e.g., in response to the external reset signal asserted on input 621 of the counter 620.

Advantageously, the present invention provides a means for initializing a PLL-based clocking system without the use of additional signals and control mechanisms. Prior attempts to initialized such a subsystem involved a system global reset signal means and/or a local reset signaling means operating independently of the unit to be reset. The present invention also provides a simple circuit that self-initializes the PLL while reducing part counts and increasing reliability through an inexpensive, scalable, modular design approach.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A reset apparatus for a clocking subsystem of a data processing system having a clock source, comprising:
   a phase locked loop (PLL) having a reference clock input for receiving clock signals from the clock source, a reset input for receiving a PLL reset signal that resets the PLL, the PLL further having an output that delivers phase aligned clock signals to logic of the data processing system;
   a circuit having a clock input to receive the clock signals and a reset input to receive a circuit reset signal, the circuit further having a PLL reset output to deliver the PLL reset signal to the PLL;
   a first timer having an input that receives the clock signals, the first timer generating a first timer signal in response to receiving the clock signals, and not generating the first timer signal in response to not receiving the clock signals; and
   a second timer having an input to receive the first timer signal, an output to deliver the circuit reset signal to the circuit in response to detecting an absence of the first timer signal, the circuit rest signal causing the circuit to reset the PLL.

2. The apparatus of claim 1, further comprising:
   the circuit having a global reset output for delivering global reset signals to logic of the data processing system.

3. The apparatus of claim 1, further comprising:
   the first timer signal generated by the first timer is a pulsed signal, and the second timer is configured to detect the presence or absence of the pulsed signal at its input.

4. The apparatus of claim 1, further comprising:
   the second timer is a watchdog timer that generates the circuit reset signal after a delay period.

5. The apparatus of claim 1, further comprising:
   the clock source is a processor of the data processing system and the clock signals are forwarded clock signals.

6. The apparatus of claim 1, further comprising:
   the circuit having an external reset input for receiving an external reset signal and an error reset output for delivering an error reset signal to a set of error registers, the error registers storing information related to the cause of a system error, the error reset signal being asserted in response to assertion of the external reset signal.

7. The apparatus of claim 6, further comprising:
   the external reset signal is generated by a voltage monitor device in response to power transitions.

8. The apparatus as in claim 7, wherein:
   the set of error registers are control status registers.

9. The apparatus of claim 1, further comprising:
   the second timer issuing the circuit reset signal to the circuit before clock signals are received at the first timer; and,
   the circuit asserting the PLL reset signal and a global reset signal in response to the reset signal from the second timer.

10. The apparatus of claim 9, further comprising:
    the second timer halting issuance of the circuit reset signal in response to receiving the first timer signal; and,
    the circuit releasing the PLL reset signal after a predetermined period of time has elapsed since receiving the circuit reset signal.

11. The apparatus of claim 10, further comprising:
    the circuit, after a subsequent predetermined period of time has elapsed since receiving the circuit reset signal, releasing the global reset signal and distributing the phase-aligned clock signals to logic of the data processing system.

12. A method for resetting a clocking subsystem of a data processing system, the method comprising:
    providing a phase locked loop (PLL) having a reference clock input for receiving clock signals from a clock source, a reset input for receiving a PLL reset signal that resets the PLL, the PLL further having an output that delivers phase aligned clock signals to logic of the data processing system
    providing a circuit having a clock input to receive the clock signals and a reset input to receive a circuit reset signal, the circuit further having a PLL reset output to deliver the PLL reset signal to the PLL;
    generating a first timer signal at a first timer circuit in response to receiving the clock signals, and not generating the first timer signal in response to not receiving the clock signals; and,
    detecting the absence of the first timer signal at a second timer having an input to receive the first timer signal, and in response to detecting the absence of the first timer signal outputting the circuit reset signal to the circuit to enable the circuit to reset the PLL in the absence of the clock signals.

13. The method of claim 12, further comprising:
    generating a global reset signal at the circuit, the circuit having a global reset signal output interconnected to logic of the data processing system.

14. The method of claim 12, further comprising
    generating the first timer signal as a pulsed signal, and the second timer is configured to detect the presence or absence of the pulsed signal at its input.

15. The method of claim 12, further comprising:
    generating the circuit reset signal after a delay period.

16. The method of claim 12, further comprising:
    providing the clock signals are forwarded clock signals from a processor of the data processing system.

17. The method of claim 12, further comprising:
providing an external reset input at the circuit for receiving an external reset signal and providing an error reset output at the circuit for delivering an error reset signal to a set of error registers; and,
asserting the error reset signal in response to assertion of the external reset signal.

18. The method of claim 17, further comprising:
generating the external reset signal at a voltage monitor device in response to power transitions.

19. The method of claim 18, wherein the set of error registers are control status registers.

20. The method of claim 12, further comprising:
issuing the circuit reset signal from the second timer to the circuit before clock signals are received at the first timer; and,
asserting the PLL reset signal and a global reset signal at the circuit in response to the reset signal from the second timer.

21. The method of claim 20, further comprising:
halting issuance of the circuit reset signal at the second timer in response to receiving the first timer signal at the second timer; and,
releasing the PLL reset signal at the circuit after a predetermined period of time has elapsed since receiving the circuit reset signal.

22. The method of claim 20, further comprising:
after a subsequent predetermined period of time has elapsed since receiving the circuit reset signal, releasing the global reset signal at the circuit and distributing the phase-aligned clock signals to logic of the data processing system.

23. A reset apparatus for a clocking subsystem of a data processing system having a clock source, comprising:
means for delivering phase aligned clock signals from a phase locked loop (PLL) to logic of the data processing system, the PLL having a reference clock input for receiving clock signals from a clock source, and a reset input for receiving a PLL reset signal that resets the PLL means for outputting a PLL reset signal to the PLL from a circuit having a clock input to receive the clock signals and a reset input to receive a circuit reset signal;

means for generating a first timer signal at a first timer in response to receiving the clock signals, and not generating the first timer signal in response to not receiving the clock signals; and, means for detecting the absence of the first timer signal at a second timer having an input to receive the first timer signal, and in response to detecting the absence of the first timer signal outputting the circuit reset signal to the circuit to enable the circuit to reset the PLL circuit in the absence of the clock signals.

24. A computer readable media, comprising:
the computer readable media containing instructions for execution in a processor for the practice of the method of claim 12.

* * * * *

UNITED STATES PATENT AND TRADEMARK OFFICE
CERTIFICATE OF CORRECTION

PATENT NO.         : 6,976,184 B2
APPLICATION NO. : 10/649523
DATED                  : December 13, 2005
INVENTOR(S)        : David Hartwell Page 1 of 1

It is certified that error appears in the above-identified patent and that said Letters Patent is hereby corrected as shown below:

In column 9, line 51, in Claim 1, delete "rest" and insert -- reset --, therefor.

In column 11, line 11, in Claim 19, delete "wherein" and insert -- wherein: --, therefor.

Signed and Sealed this

Fourth Day of August, 2009

JOHN DOLL
*Acting Director of the United States Patent and Trademark Office*